US008210920B2

(12) United States Patent
Chun

(10) Patent No.: US 8,210,920 B2
(45) Date of Patent: Jul. 3, 2012

(54) METHODS AND SYSTEMS FOR PLAYING BACCARAT JACKPOT

(76) Inventor: Jay Chun, Hong Kong (CN)

( * ) Notice: Subject to any disclaimer, the term of this patent is extended or adjusted under 35 U.S.C. 154(b) by 1116 days.

(21) Appl. No.: 11/874,158

(22) Filed: Oct. 17, 2007

(65) Prior Publication Data

US 2008/0108400 A1 May 8, 2008

Related U.S. Application Data

(63) Continuation-in-part of application No. 11/042,732, filed on Jan. 24, 2005, now Pat. No. 7,918,723, and a continuation-in-part of application No. 11/198,218, filed on Aug. 5, 2005.

(51) Int. Cl.
*A63F 13/00* (2006.01)
*A63F 1/18* (2006.01)

(52) U.S. Cl. ................ 463/12; 463/16; 463/20; 463/25; 463/26; 273/138.1; 273/139; 273/292; 273/293

(58) Field of Classification Search .............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309
See application file for complete search history.

(56) References Cited

U.S. PATENT DOCUMENTS 3,810,627 A 5/1974 Levy
3,909,002 A 9/1975 Levy
4,339,798 A 7/1982 Hedges
4,467,424 A 8/1984 Hedges
4,659,082 A 4/1987 Greenberg
4,861,041 A 8/1989 Jones et al.
4,926,327 A 5/1990 Sidley
5,033,744 A 7/1991 Bridgeman
5,042,818 A * 8/1991 Weingardt ...................... 463/27
5,048,833 A 9/1991 Lamle
5,362,064 A 11/1994 Lofink et al.
5,393,067 A 2/1995 Paulsen
5,395,119 A 3/1995 Jacob et al.
5,395,120 A 3/1995 Malek
5,476,259 A * 12/1995 Weingardt ...................... 463/28
5,605,334 A 2/1997 McCrea
5,639,092 A 6/1997 Macaisa (Continued)

FOREIGN PATENT DOCUMENTS

CA 2377577 6/2000

(Continued)

OTHER PUBLICATIONS

International Search Report for PCT/CA2006/002069, mailed Mar. 20, 2007, 16 pgs.

(Continued)

*Primary Examiner* — Arthur O. Hall
(74) *Attorney, Agent, or Firm* — Jennifer Meredith, Esq.; Meredith & Keyhani, PLLC

(57) ABSTRACT

A method and system for playing jackpot and live baccarat games are provided. One feature of the jackpot method involves the use of card combinations that may include, e.g., at least one zero-point card. Another feature of the jackpot method involves initial jackpot contribution from the banker who operates the baccarat game. It is also provided a software program or a set of software program for carrying out any or all the steps of the disclosed gaming method.

12 Claims, 13 Drawing Sheets

U.S. PATENT DOCUMENTS

| | | | | |
|---|---|---|---|---|
| 5,669,606 | A * | 9/1997 | Brown | 273/274 |
| 5,673,917 | A | 10/1997 | Vancura | |
| 5,707,287 | A | 1/1998 | McCrea | |
| 5,735,525 | A | 4/1998 | McCrea | |
| 5,762,552 | A | 6/1998 | Vuong et al. | |
| 5,770,533 | A | 6/1998 | Franchi | |
| 5,779,546 | A | 7/1998 | Meissner | |
| 5,788,574 | A | 8/1998 | Ornstein | |
| 5,795,225 | A * | 8/1998 | Jones et al. | 463/13 |
| 5,800,268 | A | 9/1998 | Molnick | |
| 5,806,854 | A * | 9/1998 | Coleman et al. | 273/292 |
| 5,830,067 | A | 11/1998 | Graves | |
| 5,836,818 | A | 11/1998 | Jones | |
| 5,842,698 | A | 12/1998 | Brown | |
| 5,876,283 | A | 3/1999 | Para et al. | |
| 5,909,876 | A | 6/1999 | Brown | |
| 5,911,626 | A * | 6/1999 | McCrea, Jr. | 463/27 |
| 5,921,865 | A | 7/1999 | Scagnelli | |
| 5,957,459 | A | 9/1999 | Chae | |
| 5,961,119 | A | 10/1999 | Brown | |
| 6,001,016 | A | 12/1999 | Walker | |
| 6,019,374 | A | 2/2000 | Breeding | |
| 6,093,103 | A | 7/2000 | McCrea | |
| 6,117,012 | A | 9/2000 | McCrea | |
| 6,146,270 | A | 11/2000 | Huard | |
| 6,159,095 | A | 12/2000 | Frohm | |
| 6,217,447 | B1 | 4/2001 | Lofink | |
| 6,279,910 | B1 | 8/2001 | De Keller | |
| 6,293,864 | B1 | 9/2001 | Romero | |
| 6,345,824 | B1 | 2/2002 | Selitzky | |
| 6,346,044 | B1 | 2/2002 | McCrea, Jr. | |
| 6,361,437 | B1 | 3/2002 | Walker | |
| 6,409,602 | B1 | 6/2002 | Wiltshire | |
| 6,460,848 | B1 | 10/2002 | Soltys et al. | |
| 6,508,709 | B1 | 1/2003 | Karmarkar | |
| 6,511,072 | B1 | 1/2003 | Santa Cruz et al. | |
| 6,517,436 | B2 | 2/2003 | Soltys | |
| 6,540,230 | B1 | 4/2003 | Walker | |
| 6,569,018 | B2 | 5/2003 | Jaffe | |
| 6,575,834 | B1 | 6/2003 | Lindo | |
| 6,582,301 | B2 | 6/2003 | Hill | |
| 6,588,758 | B1 * | 7/2003 | Lee | 273/292 |
| 6,626,757 | B2 | 9/2003 | Oliveras | |
| 6,628,244 | B1 | 9/2003 | Hirosawa | |
| 6,712,696 | B2 | 3/2004 | Soltys | |
| 6,719,291 | B1 | 4/2004 | deKeller | |
| 6,726,564 | B2 | 4/2004 | Hogan | |
| 6,755,741 | B1 | 6/2004 | Rafaeli | |
| 6,800,026 | B2 | 10/2004 | Cannon | |
| 6,808,173 | B2 | 10/2004 | Snow | |
| 6,837,494 | B2 | 1/2005 | Lee | |
| 6,896,614 | B2 | 5/2005 | Romeo | |
| 6,916,245 | B1 | 7/2005 | Vancura et al. | |
| 7,008,319 | B2 | 3/2006 | Montgomery | |
| 7,070,505 | B2 * | 7/2006 | Vancura et al. | 463/25 |
| 7,114,724 | B2 | 10/2006 | Ritzer | |
| 7,189,161 | B1 | 3/2007 | Wiltshire | |
| 7,198,272 | B2 | 4/2007 | Duhamel | |
| 7,213,812 | B2 | 5/2007 | Schubert et al. | |
| 7,264,241 | B2 | 9/2007 | Schubert et al. | |
| 7,303,475 | B2 | 12/2007 | Britt | |
| 7,309,065 | B2 | 12/2007 | Yoseloff et al. | |
| 7,316,615 | B2 | 1/2008 | Soltys | |
| 7,325,806 | B1 | 2/2008 | Feola | |
| 7,367,884 | B2 | 5/2008 | Breeding | |
| 7,404,765 | B2 | 7/2008 | Soltys | |
| 7,407,438 | B2 | 8/2008 | Schubert | |
| 7,419,160 | B1 | 9/2008 | D'Ambrosio | |
| 7,434,805 | B2 | 10/2008 | Grauzer | |
| 7,451,987 | B1 | 11/2008 | Feola | |
| 7,591,728 | B2 | 9/2009 | Gioia | |
| 7,621,533 | B2 | 11/2009 | Kenny | |
| 7,731,586 | B2 | 6/2010 | Letovsky | |
| 7,735,657 | B2 | 6/2010 | Johnson | |
| 7,753,798 | B2 | 7/2010 | Soltys | |
| 7,762,889 | B2 | 7/2010 | Shigeta | |
| 7,769,232 | B2 | 8/2010 | Downs | |
| 7,780,515 | B2 | 8/2010 | Okada | |
| 7,914,368 | B2 | 3/2011 | Chun | |
| 7,918,723 | B2 | 4/2011 | Chun | |
| 7,922,587 | B2 | 4/2011 | Chun | |
| 2001/0000118 | A1 | 4/2001 | Sines et al. | |
| 2001/0029200 | A1 | 10/2001 | Romero | |
| 2002/0002070 | A1 | 1/2002 | Romero | |
| 2002/0002073 | A1 | 1/2002 | Montgomery | |
| 2002/0015489 | A1 | 2/2002 | Ben-David | |
| 2002/0068635 | A1 | 6/2002 | Hill | |
| 2002/0072407 | A1 | 6/2002 | Soltys et al. | |
| 2002/0094869 | A1 | 7/2002 | Harkham | |
| 2002/0111205 | A1 | 8/2002 | Beavers | |
| 2002/0115489 | A1 | 8/2002 | Jordan | |
| 2002/0147042 | A1 | 10/2002 | Vuong et al. | |
| 2002/0147047 | A1 | 10/2002 | Letovsky | |
| 2003/0003997 | A1 | 1/2003 | Vuong | |
| 2003/0013510 | A1 | 1/2003 | Vuong et al. | |
| 2003/0050107 | A1 | 3/2003 | Moody | |
| 2003/0064781 | A1 | 4/2003 | Muir | |
| 2003/0069071 | A1 | 4/2003 | Britt | |
| 2003/0104854 | A1 | 6/2003 | Cannon | |
| 2003/0151199 | A1 | 8/2003 | Lee | |
| 2003/0151201 | A1 | 8/2003 | Lee | |
| 2003/0232651 | A1 * | 12/2003 | Huard et al. | 463/42 |
| 2004/0023712 | A1 * | 2/2004 | Oliver | 463/18 |
| 2004/0023722 | A1 | 2/2004 | Vuong | |
| 2004/0087357 | A1 | 5/2004 | Johnson | |
| 2004/0108656 | A1 | 6/2004 | Snow | |
| 2004/0116179 | A1 | 6/2004 | Nicely | |
| 2004/0224777 | A1 | 11/2004 | Smith | |
| 2004/0235542 | A1 | 11/2004 | Stronach | |
| 2005/0062227 | A1 | 3/2005 | Grauzer et al. | |
| 2005/0073102 | A1 | 4/2005 | Yoseloff et al. | |
| 2005/0218597 | A1 | 10/2005 | Parsadaian | |
| 2005/0233794 | A1 | 10/2005 | Cannon | |
| 2006/0052168 | A1 | 3/2006 | Shacham | |
| 2006/0063577 | A1 | 3/2006 | Downs | |
| 2006/0071429 | A1 | 4/2006 | Okujyo et al. | |
| 2006/0103071 | A1 * | 5/2006 | Ritzer et al. | 273/292 |
| 2006/0128472 | A1 | 6/2006 | Beavers | |
| 2006/0148547 | A1 | 7/2006 | Montgomery | |
| 2006/0166726 | A1 | 7/2006 | Chun | |
| 2006/0178181 | A1 | 8/2006 | Chun | |
| 2006/0226605 | A1 | 10/2006 | Kenny | |
| 2006/0287042 | A1 | 12/2006 | Osawa | |
| 2006/0287058 | A1 | 12/2006 | Resnick | |
| 2007/0026922 | A1 | 2/2007 | Lindo | |
| 2007/0026947 | A1 | 2/2007 | Chun | |
| 2007/0032283 | A1 | 2/2007 | Chun | |
| 2007/0060259 | A1 | 3/2007 | Pececnik | |
| 2007/0135204 | A1 | 6/2007 | Nicely | |
| 2007/0155512 | A1 | 7/2007 | Wells | |
| 2007/0218968 | A1 | 9/2007 | Snow | |
| 2007/0243927 | A1 | 10/2007 | Soltys | |
| 2007/0243929 | A1 | 10/2007 | Skotarczak | |
| 2007/0243935 | A1 | 10/2007 | Huizinga | |
| 2008/0026807 | A1 | 1/2008 | Moshal | |
| 2008/0076499 | A1 | 3/2008 | Lowery | |
| 2008/0085769 | A1 | 4/2008 | Lutnick | |
| 2008/0108400 | A1 | 5/2008 | Chun | |
| 2008/0113778 | A1 | 5/2008 | Chun | |
| 2008/0113783 | A1 | 5/2008 | Czyzewski | |
| 2008/0146311 | A1 | 6/2008 | Walker | |
| 2008/0194334 | A1 | 8/2008 | Kuok | |
| 2008/0230993 | A1 | 9/2008 | Chun | |
| 2008/0254881 | A1 | 10/2008 | Lutnick | |
| 2008/0280667 | A1 | 11/2008 | Chun | |
| 2008/0280668 | A1 | 11/2008 | Chun | |
| 2008/0305855 | A1 | 12/2008 | Czyzewski | |
| 2009/0029755 | A1 | 1/2009 | Chun | |
| 2009/0061974 | A1 | 3/2009 | Lutnick | |
| 2009/0069079 | A1 | 3/2009 | Britt | |
| 2009/0115133 | A1 | 5/2009 | Kelly | |
| 2009/0176547 | A1 | 7/2009 | Katz | |
| 2009/0221360 | A1 | 9/2009 | Wooding | |
| 2010/0102511 | A1 | 4/2010 | Tammesoo | |
| 2010/0105457 | A1 | 4/2010 | Miller | |
| 2010/0105459 | A1 | 4/2010 | Miller | |
| 2010/0113119 | A1 | 5/2010 | Miller | |

| | | | |
|---|---|---|---|
| 2010/0117299 | A1 | 5/2010 | Nicely |
| 2010/0222133 | A1 | 9/2010 | Spencer |
| 2010/0255897 | A1 | 10/2010 | Pececnik |
| 2010/0295247 | A1 | 11/2010 | Laduca |
| 2011/0031694 | A1 | 2/2011 | Cohen |
| 2011/0039612 | A1 | 2/2011 | Pececnik |
| 2011/0105207 | A1 | 5/2011 | Chun |
| 2011/0140362 | A1 | 6/2011 | Chun |
| 2011/0159965 | A1 | 6/2011 | Chun |

FOREIGN PATENT DOCUMENTS

| | | |
|---|---|---|
| EP | 1 101513 | 5/2001 |
| EP | 1892683 | 2/2008 |
| GB | 2408696 | 6/2005 |
| GB | 2430385 | 3/2007 |
| WO | 0079467 | 12/2000 |
| WO | 0217841 | 3/2002 |
| WO | 2005056134 | 6/2005 |
| WO | 2007016035 | 2/2007 |
| WO | 2007099334 | 9/2007 |
| WO | 2008026950 | 3/2008 |
| WO | 2008092385 | 8/2008 |
| WO | 2009107131 | 9/2009 |

OTHER PUBLICATIONS

International Search Report for PCT/CA2006/001295, mailed Nov. 2, 2006, 17 pgs.

*EZ Baccarat,* DP Stud, Inc., www.ezbaccarat.com, 2 pgs. (2003).

* cited by examiner

FIG. 4A
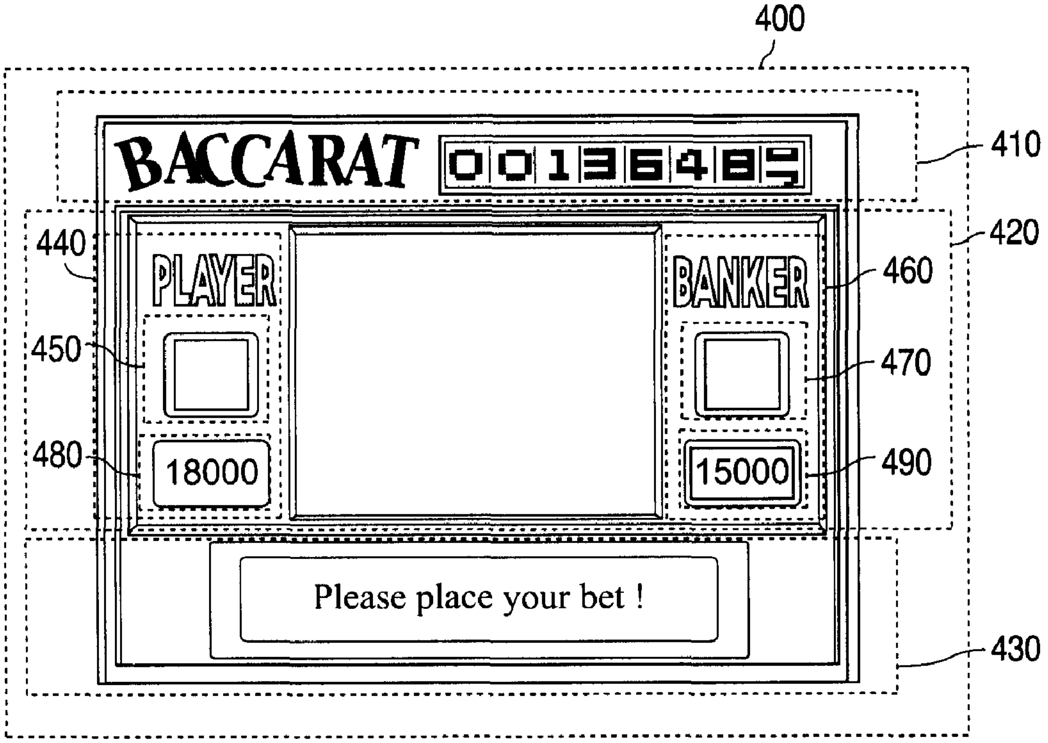
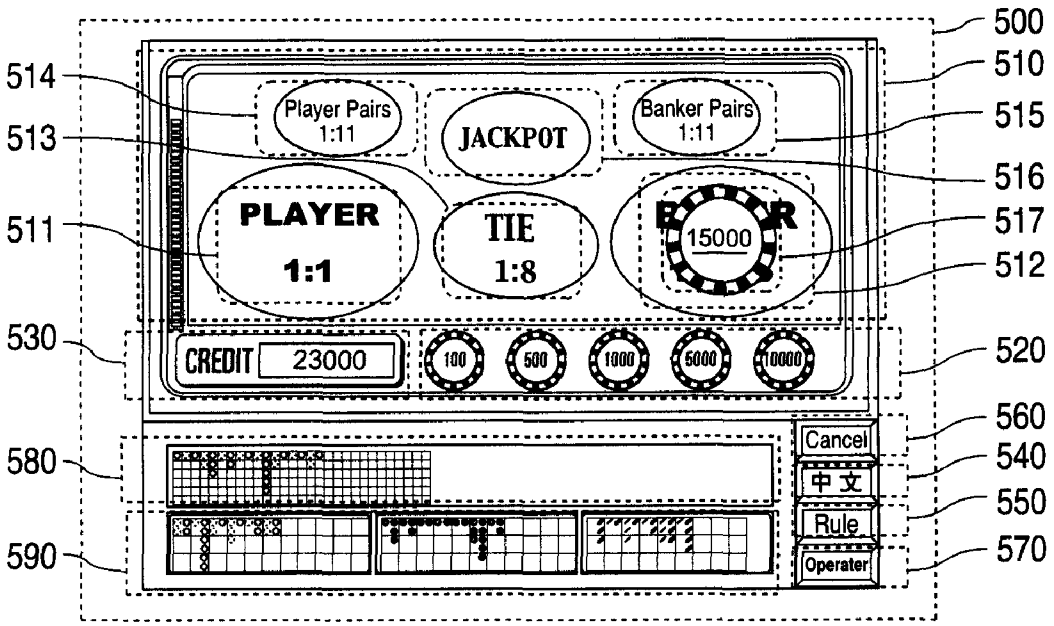
FIG. 4B

METHODS AND SYSTEMS FOR PLAYING BACCARAT JACKPOT

CROSS REFERENCE TO RELATED APPLICATIONS

This application is a continuation-in-part application of U.S. application Ser. No. 11/042,732, filed on Jan. 24, 2005 now U.S. Pat. No. 7,918,723. This application is also a continuation-in-part application of U.S. application Ser. No. 11/198,218, filed on Aug. 5, 2005. The teachings in these two applications are incorporated herein in their entirety by reference.

BACKGROUND OF THE INVENTION

The present invention is generally directed to a method of play and apparatus for playing a live baccarat game. In particular, the present invention relates to a method for playing a live baccarat game and playing jackpot.

Baccarat is one of the more popular gambling games played in casinos or gaming establishments. As is well known, the game is played on an elongated table having a game board displayed along the upper surface of the table. The game board displays certain wagering areas, and the elongated table allows for the seating of multiple players or bettors (1-16) and the positioning of the multiple dealers (3) necessary for operating the casino game. Bettor locations are typically numbered on the table and each bettor location has an area designated for a wager on the bank hand and an area designated for a wager on the player hand. Baccarat uses a standard deck of 52 playing cards and is usually dealt from a shoe having multiple decks that have been shuffled together prior to the beginning of play.

A feature of conventional baccarat games is that they have relatively simple rules. However, the simplicity of the rules has led to a corresponding simplicity in the relatively few types of wagers which may be placed during the play of the game, which may limit interest on the part of the player(s) and thus further limit the casino in terms of profit and payout.

The embodiments described below address the above-described issues and needs.

SUMMARY OF THE INVENTION

Provided herein are methods and systems therefore for playing a modified live baccarat game. The methods allow the wagering on the live baccarat games according to conventional rules. In addition, the methods provided herein allow betting on a site bet or wager for jackpot. In some embodiments, outcomes of the jackpot betting can be determined by combinations of cards that involve at least one zero-point card, described below. In some other embodiments, outcomes of the jackpot betting can be determined by specific combinations of cards defined below. The present invention also provides a jackpot gaming method that allows the banker to make initial contributions for the jackpot game.

The method for playing live baccarat described herein includes the following steps:

dealing cards to a player hand and a bank hand according to a set of conventional baccarat rules, allowing at least a first player to place a bet on live baccarat, allowing at least a second player to place a bet on jackpot where the second player can be the same as or different from the first player, determining the outcome of the live baccarat game according to the set of conventional baccarat rules, and determining the outcome of the jackpot according to a combination of cards defined herein.

The present invention also discloses a software program or a set of software programs for carrying out any or all steps of the betting method described herein. The live baccarat game can also be incorporated into an electronic device or an entertainment gaming machine.

BRIEF DESCRIPTION OF DRAWINGS

FIGS. 4A and 4B show the detailed layout of the betting terminal of a baccarat machine.

DETAILED DESCRIPTION

Figure 1:
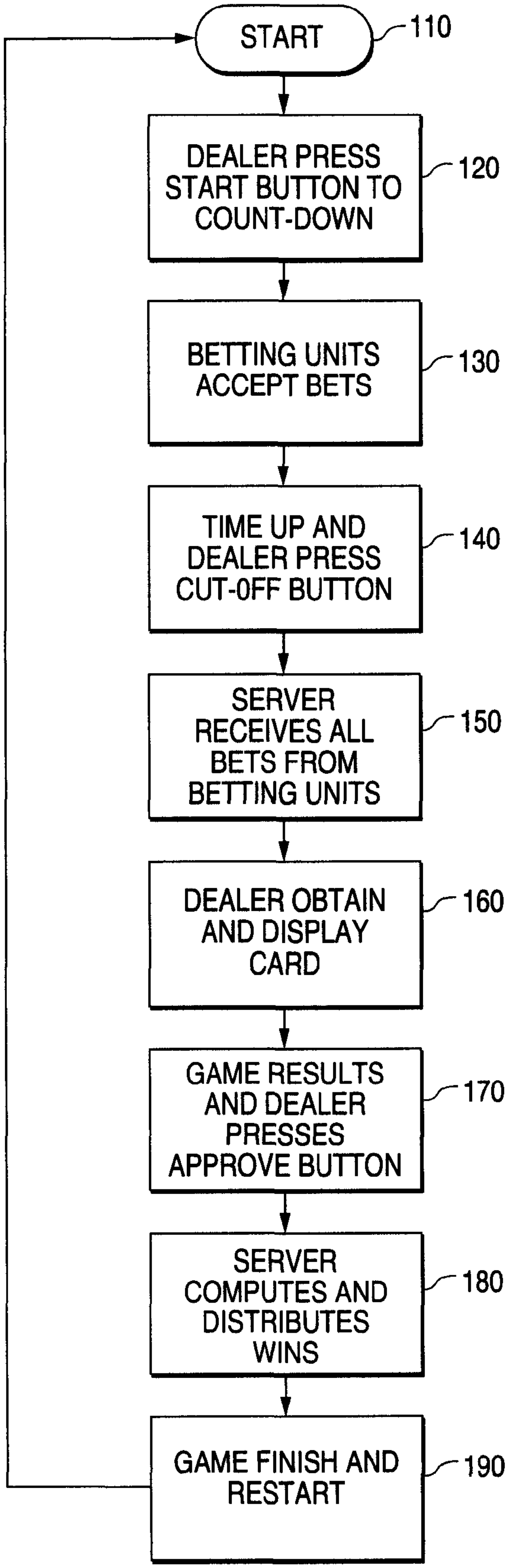
FIG. 1 is a flow chart disclosing the incorporation of the present betting methods in the game of baccarat.

Provided herein are methods and systems therefore for playing a modified live baccarat game. The methods allow the wagering on the live baccarat games according to conventional rules. In addition, the methods provided herein allow betting on a site bet or wager for jackpot. The present invention also provides a jackpot gaming method that allows the banker to make initial contributions for the jackpot game. As used herein, a zero-point card refers to any of the 10, J, Q, or K, and the banker refers to one who owns or operates the live baccarat establishment.

In general, the method for playing live baccarat described herein includes the following steps:

dealing cards to a player hand and a bank hand according to a set of conventional baccarat rules, allowing at least a first player to place a bet on live baccarat, allowing at least a second player to place a bet on jackpot where the second player can be the same as or different from the first player, determining the outcome of the live baccarat game according to the set of conventional baccarat rules, and determining the outcome of the jackpot according to a combination of cards defined below.

In some embodiments, the outcome of the jackpot can be a winning jackpot by from 1% to 100% of the jackpot, e.g., about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% of the jackpot. As used herein, the term “about” shall encompass any percentage that falls within 15% of the indicated value.

The present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers.

Live Baccarat Game

The object of baccarat is for the bettor to successfully wager on whether the bank’s hand or the player’s hand is going to win. The bettor receives even money for his wager if he selects the winning hand and loses his wager if he selects the losing hand. Because of the rules of play of baccarat, the bank’s hand has a slightly higher chance of winning than does the player’s hand. Therefore, if the bettor wagers on the bank’s hand, the bettor is required to pay to the gaming establishment a commission (typically 5%) of the amount the bettor wins. No commission is paid if the bettor successfully wagers on the player’s hand.

The term “wager”, as used herein, can be used interchangeably with the term “bet.” The term “wagering” is used interchangeably with the term “betting.”

Conventional methods of playing baccarat are described as follows:

A multiple number of decks of standard playing cards, 52 in number, are used; typically six to twelve decks are shuffled together and placed in a shoe from which the cards are dealt during the play of the game.

Each bettor makes a wager on whether the bank’s hand or the player’s hand will win. After all wagers are made, two cards are dealt from the shoe to the bank position and two cards are dealt from the shoe to the player’s position on the table layout. The cards are turned face up and the value of the bank hand and the player hand is determined.

Aces count as one; kings, queens, jacks and tens count as zero and the other cards count as their respective face value. The suits (hearts, diamonds, spades and clubs) have no meaning in baccarat. The highest hand value in baccarat is nine. All hand values range from a low of zero to a high of nine. If when the cards are added together, the total of the hand exceeds nine, then the hand value is determined by subtracting ten from the total of the hand. For example, a seven and nine total sixteen, but the hand value is six. An Ace and a nine total ten, but the hand value is zero.

A two card total of eight or nine is called a “natural”; a two card total of zero is called a “baccarat”. As will be explained hereafter, in certain situations in the play of the game, a third card will be dealt. The value of this third card is added to the total of the first two cards and a new hand value is established. Again, if the new hand total exceeds nine, the hand value is determined by subtracting ten from the total of the hand. Wagering locations are provided on the baccarat table layout. Whichever of the bank hand or the player hand is closest to a total of nine is the winner.

The way of betting may differ in different gaming establishments. In the U.S., for example, prior to the deal, each bettor can make one of three wagers: 1) that the bank hand will win, 2) that the player hand will win, or 3) that the bank hand and the player hand will tie. In Macau, for example, one can make one of five wagers: 1) that the bank hand will win, 2) that the player hand will win, 3) that the bank hand and the player hand will tie, 4) that the first two cards in the bank hand are of the same kind, regardless of the type of suit, forming a Bank Pair, or (5) that the first two cards in the player hand are of the same kind, regardless of the type of suit, forming a Player Pair.

All winning bank hand wagers in scenario 1) in both the U.S. and Macau are paid off at odds of one-to-one and the house charges a five percent (5%) commission on the amount won by the bettor. For example, if a bettor wagers $100 on the bank hand and the bank hand wins, the bettor wins $100 and is charged a $5 commission on the amount that the bettor won. The bettor is not charged any commission on the amount of his wager.

All wagers that select winning player hand in scenario 2) in both the U.S. and Macau are paid off at odds of one-to-one and the bettor is not charged any commission on the amount of his winnings or his wager.

All winning wagers on the tie in scenario 3) in both the U.S. and Macau can be paid off at odds of eight-to-one (depending on the gaming establishment) and the bettor is not charged any commission on the amount of his winnings or his wager. If a tie hand occurs, all wagers on the bank hand and all wagers on the player hand are “pushes” and the amount wagered is returned to the bettor.

All winning wagers on the Bank Pair bet in scenario 4) in Macau can be paid off at odds of eleven-to-one (depending on the gaming establishment) and the bettor is not charged any commission on the amount of his winnings or his wager.

All winning wagers on the Player Pair bet in scenario 5) in Macau can be paid off at odds of eight-to-one (depending on the gaming establishment) and the bettor is not charged any commission on the amount of his winnings or his wager.

The play of baccarat typically uses three casino dealers to operate the game. The casino dealers jointly participate in the shuffling of the decks of cards. After the shuffle is completed, one of the players is typically asked to cut the decks using a plastic cut card. The dealer then separates and restacks the cards from the point of the cut and the dealer or a player then inserts the plastic cut card no less than fifteen cards (in Las Vegas, U.S.) or no less than twelve cards (in Macau) from the ends of the stacked decks and the entire stacked decks are placed into a shoe from which the cards are dealt during the play of the game. When the inserted plastic cut card appears during play, the hand in progress is completed and that round of play then ends. The cards are reshuffled to prepare for the next round of baccarat.

In conventional baccarat, the bettors deal the cards used in the game. Initially, one of the casino dealers (called the “caller”) passes the shoe to the bettor sitting in seat number “1” at the baccarat table. After all wagers have been made, the caller tells the bettor with the shoe to begin the deal. The bettor deals a first card to the caller, a first card to himself, a second card to the caller and a second card to himself. All cards are dealt face down. The two cards given to the caller represent the player hand and the two cards kept by the bettor who is dealing the cards represent the bank hand.

The caller than allows one of the other bettors to turn up the player’s hand. Traditionally, this honor is given to the bettor who has made the largest wager. The bettor turns up the two cards of the player’s hand and tosses them to the caller. The caller places these two cards face up in the table location designated for the “player hand” and the caller announces the point total of the player hand.

The bettor who has the shoe then turns over the cards of the bank hand and tosses these two cards to the caller. The caller places these two cards face up in the table location designated for the “bank hand” and the caller announces to point total of the bank hand. Depending on the point total of the player's hand and the bank's hand, one more card may be dealt to either the player's hand, the bank's hand, or both. The rules for determining whether a third card is dealt are fixed rules, there is no discretion for either the player's hand or the bank's hand on whether a third card is dealt.

If either the player hand or the bank hand has a point total of eight or nine on the first two cards, no third card is dealt to either hand and the hand with the highest point total is the winner (or the hand is a tie, as the case may be). If neither the player hand or the bank hand has a point total of eight or nine, then there is a possibility of a third card draw.

The third card draw rules are as follows:

Rule #1: If the initial two card player hand has a point total of 0, 1, 2, 3, 4 or 5, draws a third card. If the initial two card player hand has a point total of 6 or 7, the player hand stands and does not receive a third card.

Rule #2: If the player hand stands and does not draw a third card, then the bank hand follows Rule #1. In other words, if the player hand has a point total of 6 or 7, the bank hand draws a third card on a point total of 0, 1, 2, 3, 4 or 5 and the bank hand stands on a point total of 6 or 7.

Rule #3: If the player hand draws a third card, the bank hand must draw or stand as described in Table 1.

TABLE 1

| Bank hand two card point total | Bank hand draws when the player's hand third card is: | Bank hand stands when the player's hand third card is: |
|---|---|---|
| 0, 1 or 2 | Bank always draws | — |
| 3 | 0, 1, 2, 3, 4, 5, 6, 7 or 9 | 8 |
| 4 | 2, 3, 4, 5, 6 or 7 | 0, 1, 8 or 9 |
| 5 | 4, 5, 6 or 7 | 0, 1, 2, 3, 8 or 9 |
| 6 | 6 or 7 | 0, 1, 2, 3, 4, 5, 8 or 9 |
| 7 | — | Bank always stands |

All third card draw determinations are automatically made by the caller who is skilled in the game of baccarat. When the rules of baccarat require a third card for the player hand, the caller will request a card for the player hand. After the player hand is completed, the bank hand is completed in the same fashion. The caller then declares which hand has the highest point total and declares that hand the winner (or the caller declares a tie hand as the case may be).

In conventional baccarat the bettor who acts as the dealer continues to deal the cards until the player hand wins. As soon as the player hand wins, it is customary to pass the shoe counterclockwise around the baccarat table to the next bettor so that each bettor has the opportunity to deal the cards. Any bettor may decline to deal the cards. The fact that one of the bettors is physically dealing the cards has no affect on the outcome of the game because the rules for drawing and standing do not allow any discretion on the part of the players.

The players can play the game according to conventional baccarat rules, which may vary from place to place. In one embodiment, the baccarat game is played according to the U.S. rules as used in Las Vegas. In another embodiment, the baccarat game is played according to the baccarat rules promulgated by the government of Macau Special Administration Region.

In some embodiments, there is a maximum limit on the total bet can be made through a single betting terminal for the live baccarat game. In one embodiment, the maximum bet can be made through one terminal for live baccarat is, for example, HK$20,000.

Jackpot

The method and system described herein provide a method for jackpot betting, Paradise Jackpot™. The players of the live baccarat game can make a separate bet for jackpot. The jackpot bet can be placed with a bet for live baccarat or without a bet for the same live baccarat.

In some embodiments, the outcome of the jackpot betting is determined by the combination of cards that includes zero-point cards. The combination includes at least one zero-point cards, which are 10, J, Q and K. In one embodiment, the rules for playing Paradise Jackpot™ are described below:

(1) The gaming system provides a jackpot. Players who wish to bet on the Paradise Jackpot™ can place a separate bet, e.g. HKD 20 per game in minimum, which will be referred to as bet unit. The maximum number of bet units will not be restricted.

(2) Players can bet in Paradise Jackpot™ without placing bet in the same live baccarat game. Each player can place more than one bet unit in one game. When the Paradise Jackpot™ is won, the payout for each bet unit will be equal to the money in the Paradise Jackpot™ pool divided by the total number of bet unit.

(3) If the first 5 cards drawn in one baccarat game resulting in A, K, Q, J, 10 in spade, regardless of the sequence, then 100% of the Paradise Jackpot™ is won.

(4) If the first 5 cards drawn in one baccarat game resulting in K, Q, J, 10 in spade and A in either heart, club or diamond, regardless of the sequence, then 10% of the Paradise Jackpot™ is won. In some embodiments, the winning combinations for 10% of the jackpot can be any of the following Spade A plus K, Q, J, 10 in Heart, Club or Diamond;
Heart A plus K, Q, J, 10 in Spade, Club or Diamond;
Club A plus K, Q, J, 10 in Spade, Heart or Diamond; or
Diamond A plus K, Q, J, 10 in Spade, Heart, or Club.

In some other embodiments, the Paradise Jackpot™ can be played according to Rules (I)-(III), defined below:

(I) The Paradise Jackpot™ is won if any of the following is met:

1) any five cards forming a sequence, regardless of the order they are drawn, e.g., A, 2, 3, 4, 5 or 9, 10, J, Q, K;

2) five cards of a kind, e.g. A, A, A, A, A or K, K, K, K, K;

3) four cards of a kind, regardless of the order they are drawn, e.g., K, K, K, K, 2 or 2, K, K, K, K;

4) three cards of a kind plus a pair, regardless of the order they are drawn, e.g., 10, 10, 10, 2, 2;

5) three cards of a kind, regardless of the order they are drawn, e.g., 2, 2, 2, 10, J 6) two pairs, regardless of the order they are drawn, e.g., Q, Q, 2, K, K;

7) all the 5 cards of the same symbols (same suit): spade, heart, club or diamond, e.g., A(spade), 10(spade), J(spade), K(spade), Q(spade); or 8) any specific combination of five cards as specified from time to time.

(II) The Paradise Jackpot™ is won by any specific combination of the first four, three or two cards drawn in a live baccarat game, with regard to/regardless of the drawn sequence. Specifically, the Paradise Jackpot™ is won if any of the following is met:

(A) if the first four cards that are drawn form a combination as defined below:

1) the first four cards forming a sequence, with regard to/regardless of the order they are drawn, e.g., A, 2, 3, 4, or 10, J, Q, K;
2) the first four cards of a kind, e.g. A, A, A, A or J, J, J, J;
3) three cards of a kind, with regard to/regardless of the order they are drawn, e.g., K, K, K, 2 or 10, 10, 10, 2;
4) two cards of a kind plus a pair, with regard to/regardless of the order they are drawn, e.g., 2, 2, J, J, which is a two pair sequence;

5) two cards of a kind, with regard to/regardless of the order they are drawn, e.g., 10, 10, Q, Q;

6) all the four cards of the same symbols (same suit): spade, heart, club or diamond, e.g., A(spade), 10(spade), J(spade), K(spade); or 7) any specific combination of the first four cards as specified from time to time, (B) if the first three cards that are drawn form a combination as defined below:

1) the first three cards forming a sequence, with regard to/regardless of the order they are drawn, e.g., A, 2, 3, or 10, J, K;

2) the first three cards of a kind, e.g. A, A, A or 2, 2, 2;

3) two cards of a kind, with regard to/regardless of the order they are drawn, e.g., K, K, 2 or 10, 10, 2;

4) two cards forming a pair, with regard to/regardless of the order they are drawn, e.g., 2, J, J or J, J, 2;

5) all the three cards of the same symbols (same suit): spade, heart, club or diamond, e.g., A(spade), J(spade), K(spade); or 6) any other specific combination of the first four cards as specified from time to time, or (C) if the first two cards that are drawn form a combination as defined below:

1) the first two cards forming a sequence, with regard to/regardless of the order they are drawn, e.g., A, 2, or J, Q;

2) the first two cards of a kind, e.g. A, A or 10, 10, which is also a pair;

3) the first two cards of the same symbols (same suit): spade, heart, club or diamond, e.g., A(spade), 10(spade); or 4) any other specific combination of the first four cards as specified from time to time.

(III) The Paradise Jackpot™ is won by any specific combination of the last six, five, four, three, and two cards drawn in a live baccarat game, with regard to/regardless of the drawn sequence. Specifically, the Paradise Jackpot™ is won if any of the following is met:

(A) if the last six cards that are drawn form a combination as defined below:

1) the last six cards forming a sequence, with regard to/regardless of the drawn sequence they are drawn, e.g., A, 2, 3, 4, 5, 6 or 8, 9, 10, J, Q, K;

2) six cards of a kind, e.g. A, A, A, A, A, A or 2, 2, 2, 2, 2, 2;

3) five cards of a kind, with regard to/regardless of the order they are drawn, e.g., K, K, K, K, K, 2 or 2, 10, 10, 10, 10, 10;

4) four cards of a kind, with regard to/regardless of the order they are drawn, e.g., K, K, K, K, 2, 10 or 2, A, J, J, J, J;

5) four cards of a kind plus a pair, with regard to/regardless of the order they are drawn, e.g., K, K, K, K, 2, 2 or 2, 2, J, J, J, J;

6) three cards of a kind plus a pair, with regard to/regardless of the order they are drawn, e.g., 2, 2, 2, J, J, A or J, J, 2, 2, 2, K;

7) three cards of a kind, with regard to/regardless of the order they are drawn, e.g., A, A, A, 10, J, K or 10, J, K, 2, 2, 2;

8) three pairs, with regard to/regardless of the order they are drawn, e.g., Q, Q, K, K, J, J or 2, 2, 10, 10, K, K;

9) all the six cards of the same symbols (same suit): spade, heart, club or diamond, e.g., A(spade), 10(spade), J(spade), K(spade), Q(spade), 2(spade); or 10) any other specific combination of six cards as specified from time to time.

(B) if the last five cards that are drawn form a combination as defined below:

1) the last five cards forming a sequence, with regard to/regardless of the order they are drawn, e.g., A, 2, 3, 4, 5 or 9, 10, J, Q, K;

2) five cards of a kind, e.g. A, A, A, A, A or 2, 2, 2, 2, 2;

3) four cards of a kind, with regard to/regardless of the order they are drawn, e.g., K, K, K, K, 2 or 2, 10, 10, 10, 10;

4) three cards of a kind plus a pair, regardless of the order they are drawn, e.g., 2, 2, 2, J, J;

5) three cards of a kind, regardless of the order they are drawn, e.g., 2, 2, 2, 10, Q;

6) two pairs, regardless of the order they are drawn, e.g., Q, Q, A, 10, 10;

7) all the 5 cards of the same symbols (same suit): spade, heart, club or diamond; e.g., A(spade), 10(spade), J(spade), K(spade), Q(spade); or 8) any other specific combination of five cards as specified from time to time, (C) if the last four cards that are drawn form a combination as defined below:

1) the last four cards forming a sequence, with regard to/regardless of the order they are drawn, e.g., A, 2, 3, 4, or 10, J, Q, K;

2) the last four cards of a kind, e.g. A, A, A, A or 10, 10, 10, 10;

3) three cards of a kind, with regard to/regardless of the order they are drawn, e.g., K, K, K, 2 or 10, 10, 10, 2;

4) two cards of a kind plus a pair, regardless of the order they are drawn, e.g., A, A, J, J, which is a two pair sequence;

5) two cards of a kind, regardless of the order they are drawn, e.g., 2, 2, Q, Q;

6) all the four cards of the same symbols (same suit): spade, heart, club or diamond, e.g., A(spade), 10(spade), K(spade), Q(spade); or 7) any other specific combination of the first four cards as specified from time to time, (D) if the last three cards that are drawn form a combination as defined below:

1) the last three cards forming a sequence, with regard to/regardless of the order they are drawn, e.g., A, 2, 3, or J, Q, K;

2) the last three cards of a kind, e.g. A, A, A or Q, Q, Q;

3) two cards of a kind, with regard to/regardless of the order they are drawn, e.g., K, K, 2 or 10, 10, 2;

4) two cards forming a pair, with regard to/regardless of the order they are drawn, e.g., 2, J, J or J, J, 2;

5) all the last three cards of the same symbols (same suit): spade, heart, club or diamond, e.g., A(spade), J(spade), K(spade); or 6) any other specific combination of the first four cards as specified from time to time, (E) if the last two cards that are drawn form a combination as defined below:

1) the last two cards forming a sequence, with regard to/regardless of the order they are drawn, e.g., A, 2, or 10, J;

2) the last two cards of a kind, e.g. A, A or 2, 2, which is also a pair;

3) the last two cards of the same symbols (same suit): spade, heart, club or diamond, e.g., A(spade), 10(spade); or 4) any other specific combination of the first four cards as specified from time to time.

The combinations of cards not defined above can be readily derived from time to time with or without the assistance of a computer following established rules of forming combinations of a set of defined members. The amount of Paradise Jackpot™ award can be determined by and distributed according to, e.g., the probability of a combination of cards as defined above or otherwise specified from time to time.

There may be more than one live baccarat game going on simultaneously in different casinos in Macau. In some embodiments, all Paradise Jackpot™ bets from different live baccarat tables will contribute to one grand Paradise Jackpot™ pool. If the Paradise Jackpot™ is won in any one live baccarat table, all players who place Paradise Jackpot™ bets, regardless of the live baccarat table they bet, will share the grand Paradise Jackpot™ pool according to the bet units that each player placed in the jackpot betting.

Paradise Jackpot™ can be played with bets from players as the sole source of the jackpot pool or with bets and an initial contribution from the banker. The term "banker" generally refers to the owner of a gaming establishment operating the live baccarat defined herein or one who operates the live baccarat game. In one embodiment, the banker contributes a sum of money as the initial Paradise Jackpot™ (e.g., HKD 50,000). A certain percentage, e.g., 55%, of the Paradise Jackpot™ bets from the players will be contributed towards the Paradise Jackpot™ pool, a certain percentage (e.g., 40%) of the bets will be collected by the banker as profit, and the remaining portion (e.g., 5%) of the bets will be accumulated as the seed for the next game.

An embodiment of the general gaming method described herein is shown in the flowchart in FIG. 1. The flowchart shows the steps in playing the live baccarat games described herein. Step 110 shows the baccarat is ready to start a game. In step 120, the dealer presses the Start button on the baccarat machine to count-down the time for accepting bets. In step 130, the betting terminal, BU, accepts bets. Step 140 shows that the time for accepting bets is over and the dealer press the Cut-off button on the machine. In step 150, the server, which is also referred to as betting computation and track record central processing unit (BCPU), receives all bets from betting terminals. The dealer then obtains and displays cards in step 160. In step 170, the baccarat game gives results and the dealer presses approve button, approving the card dealing made, game results and payouts. The server, BCPU, then computes and distributes wins in step 180. The live baccarat game is over, as shown in step 190, and the machine is ready for next round of baccarat game that begins with step 110.

In another aspect of the present invention, it is provided a software program or a set of software programs that allows a user or player to any or all of the various aspects of playing the live baccarat Paradise Jackpot™ described herein. The software program can be written by one of ordinary skill in the art.

Gaming System

Figure 2:
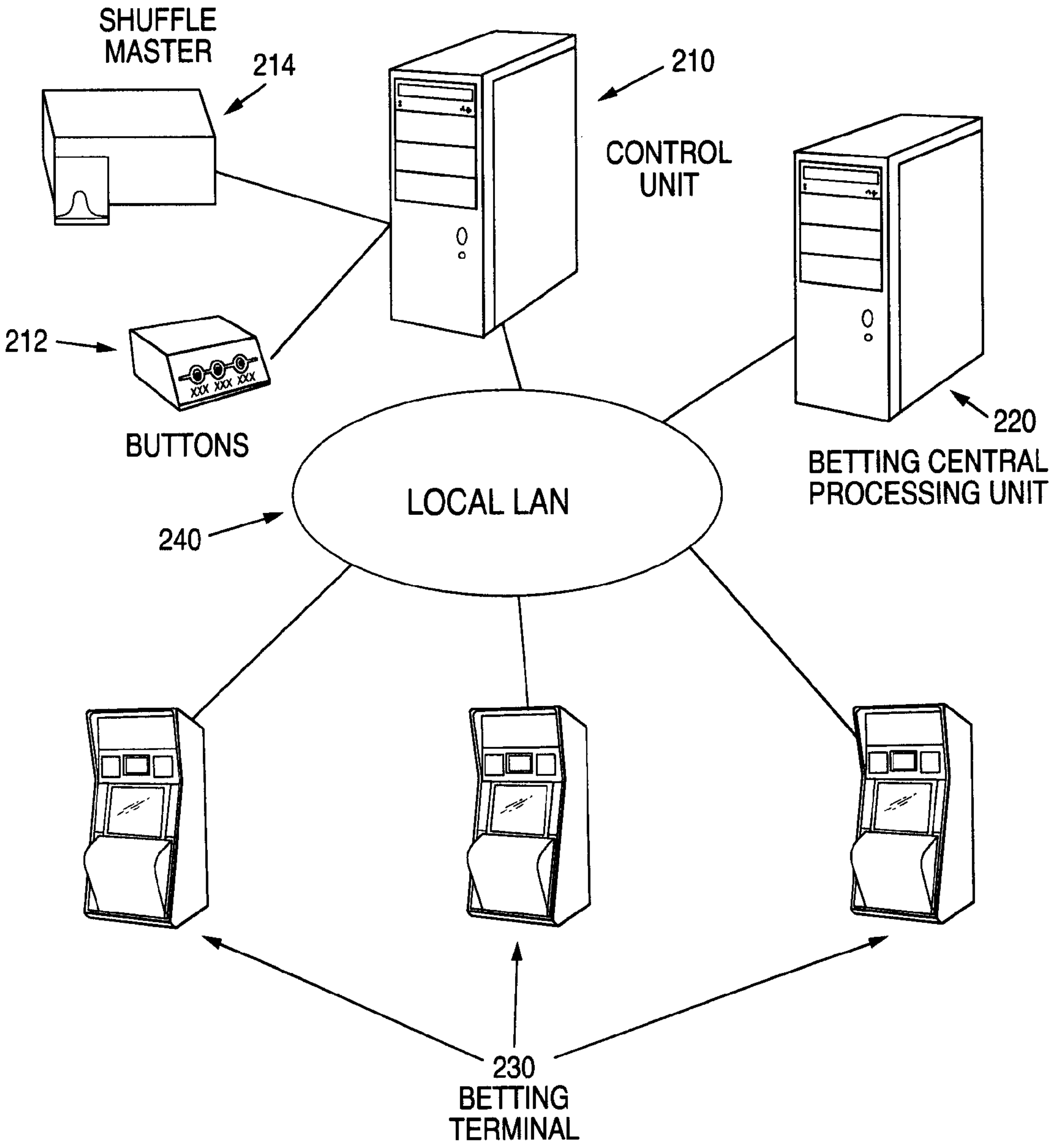
FIG. 2 shows a system embodying live baccarat jackpot of the present invention.

One aspect of the present invention provides a baccarat gaming system that allows one to play the live baccarat jackpot described herein. One embodiment of the present invention is shown in FIG. 2. Referring FIG. 2, the baccarat gaming system includes three members: (1) the control unit for automatic shuffle mechanism (CU) (210), (2) betting computation and tract record central processing unit (BCPU) (220), and (3) betting terminal for players (BT) (230) (FIG. 2). The control unit 210 may further contain control buttons (212) that allows the dealer to control the shuffling mechanism, which can be manual or automatic, and/or a shuffle master (214), which can be manual or automatic, for shuffling the cards. The CU 210 can include any or all of the components which may include control buttons that allow input from dealer and/or capable of (1) receiving the shuffle mechanism input, (2) sending visual output to a screen, and/or (3) sending card results in the player hand and/or bank hand to BCPU 220. The BCPU 220 has components or members capable of performing any or all of (1) receiving betting from BT (230), (2) receiving card results from CU 210, (3) sending betting results to BT 230, and/or (4) sending credit to BT 230.

The betting terminal for players, BT 230, has components or members capable of performing any or all of (1) sending betting to BCPU 220, (2) receiving betting results from BCPU 220, and/or (3) receiving credit from BCPU 220. Note, the baccarat gaming system can have a number of betting terminals, depending on the need of a gaming establishment. For example, if desirable, the baccarat gaming system can have 1, 2, 3, 4, 5, 6, 7, 8, 9, or 10, up to, e.g., 50 or 250 BTs. CU 210, BCPU 220, and BT 230 can be linked together via a local area network (LAN) (240) to form a baccarat gaming network between one, two, three or several gaming establishments.

The live baccarat game can have different variations. For example, the game can be played separately as a single live baccarat game. In some embodiments, the individual baccarat games as played in each betting terminal can be linked together. The individual games can all be played in a casino or gaming establishment or in several casino or gaming establishments. The individual games played in different betting terminals can be the same or different. Therefore, some or all of the baccarat games played in individual betting terminals, which can be the same or different baccarat games, can be linked together for a single jackpot.

Figure 3:
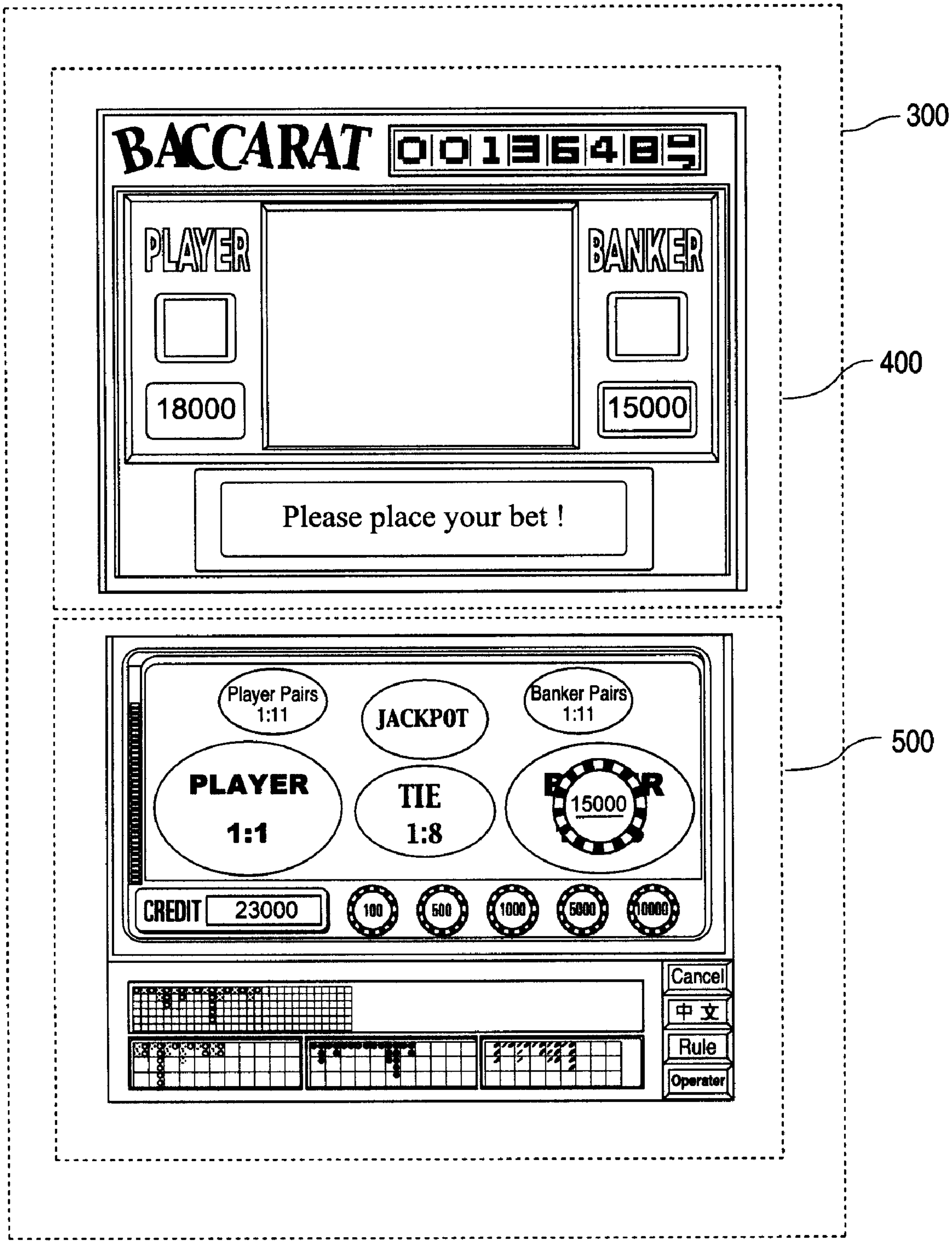
FIG. 3 shows the general layout of a baccarat machine.

A layout for the live baccarat game described herein is shown in FIGS. 3, 4A and 4B. FIG. 3 shows the overall layout of the betting terminal (300), which has two screens, the upper screen (400) and the lower screen (500), shown in detail in FIGS. 4 and B. Referring to FIG. 4A, upper screen 400 includes an upper part (410) for displaying the result, score and latest jackpot amount, the center part (420) for displaying a live video of the gambling table, and a messenger screen (430) for displaying messages. In one embodiment, the jackpot amount digits can be programmed to be in rolling motion to reflect the increasing jackpot pool. The center part of the upper screen has a section designated as Player (440), which has a small screen (450), and another section designated as Banker (460), which also has a small screen (470). The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively.

Referring to FIG. 4B, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 1:8, for Player Pairs (514) with a payoff rate of 1:11, for banker pairs (515) with a payoff rate of 1:11, and for Jackpot bet (516), the rules of which are described above. Box 517 shows the pops up when bets are placed on a particular bet option. The number inside Box 517 corresponds to the amount placed on a particular bet option. The bet-amount buttons 520 as shown in the layout, 100, 500, 1000, 5000, 10000, provide the players the convenience of adding up betting amounts in a fast manner. To illustrate, for a bet of 10,000 USD or HKD, the player can simply press the "1000" button ten times to reach the desired betting amount. Note, the bet-amount buttons 520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance.

Still referring to FIG. 4, the lower screen 500 further includes language selection button (540), which can switch the operation language of the baccarat game between, e.g., English, Portuguese, Italian, French, Spanish, Russian, German, Arabic, Japanese, and Korean, etc, Rule selection button (550), which prompts the display of rules for live baccarat and Paradise Jackpot™, Cancel button (560), which allows the bettor to cancel all bets made before the cards are dealt, Operator button (570), which allows the bettor to call for assistance from the casino staff when there is machine failure or the bettor wishes to exit from the game, and Results Bars (580, 590) which display the results for previous live baccarat games. Once results of a game are confirmed, the losing bet shown in the bet option buttons (510) in the center of lower screen will disappear while the winning bet in the bet option buttons (510) in the lower screen will flash with the total amount won.

Figure 4C:
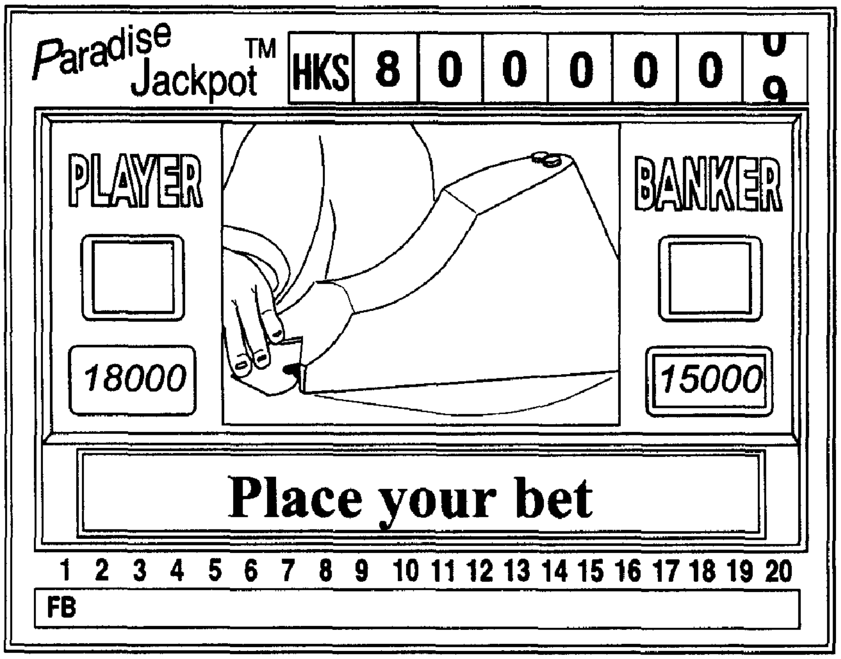
FIGS. 4C and 4D show a variant of the layout of the betting terminal shown in FIGS. 4A and 4B.

FIG. 4C is an alternative design of the upper screen 400 as shown in FIG. 4A, which has a similar layout as the one shown in FIG. 4A except that the top right corner of the upper screen displays the words "Paradise Jackpot™", and the bottom rim has a blank bar and numbers 1 through 20 on top of the bar.

Figure 4D:
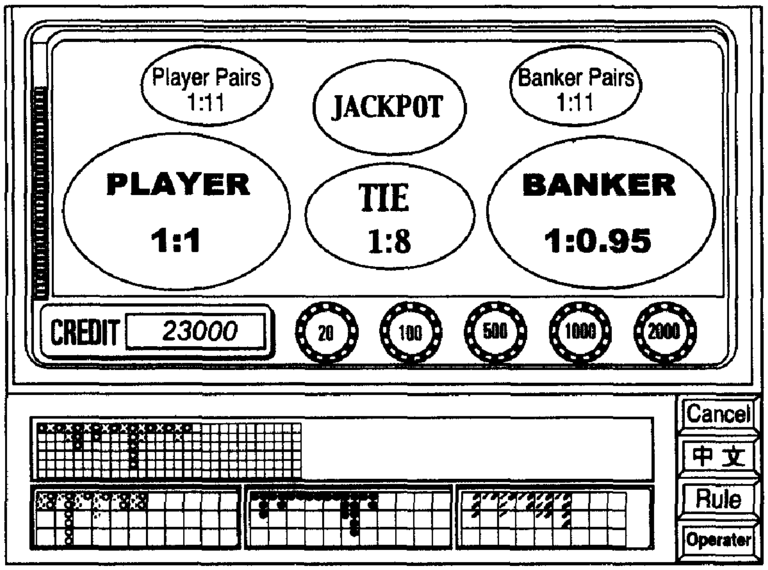

FIG. 4D is an alternative design of the lower screen of 500 as shown in FIG. 4B, which as a similar layout as the one shown in FIG. 4B except that the top rim of the lower screen 500 bears letters indicating the left side as the Player side and the right side and the Banker side, a screen at the far up-left corner indicating the maximum bet on the player hand accepted by the dealing table in a game, and a screen at the far up-right corner indicating the maximum bet on the banker hand accepted by the dealing table in a game.

Figure 5:
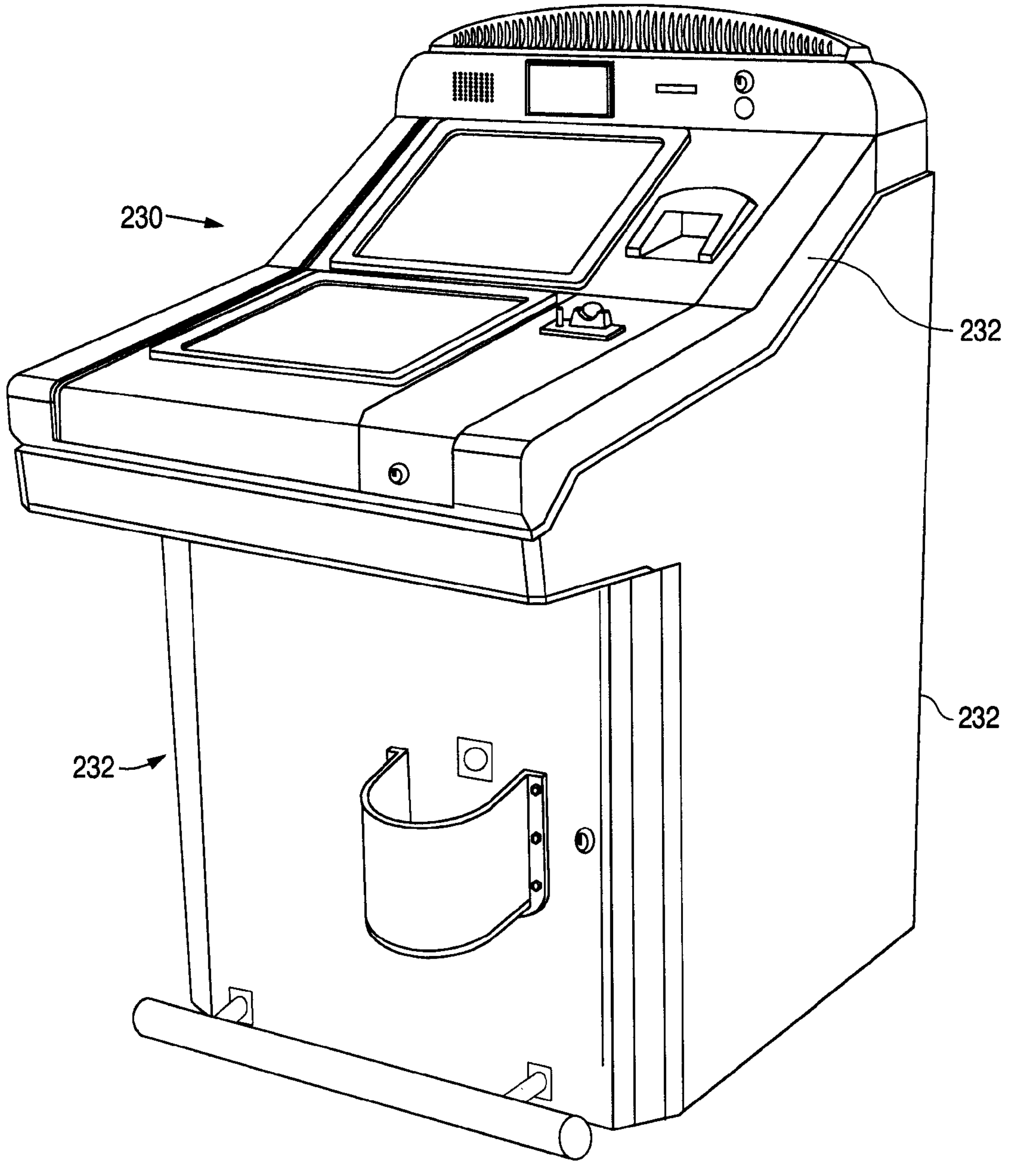
FIG. 5 shows an embodiment of the overall design of the betting terminal.
Figure 6:
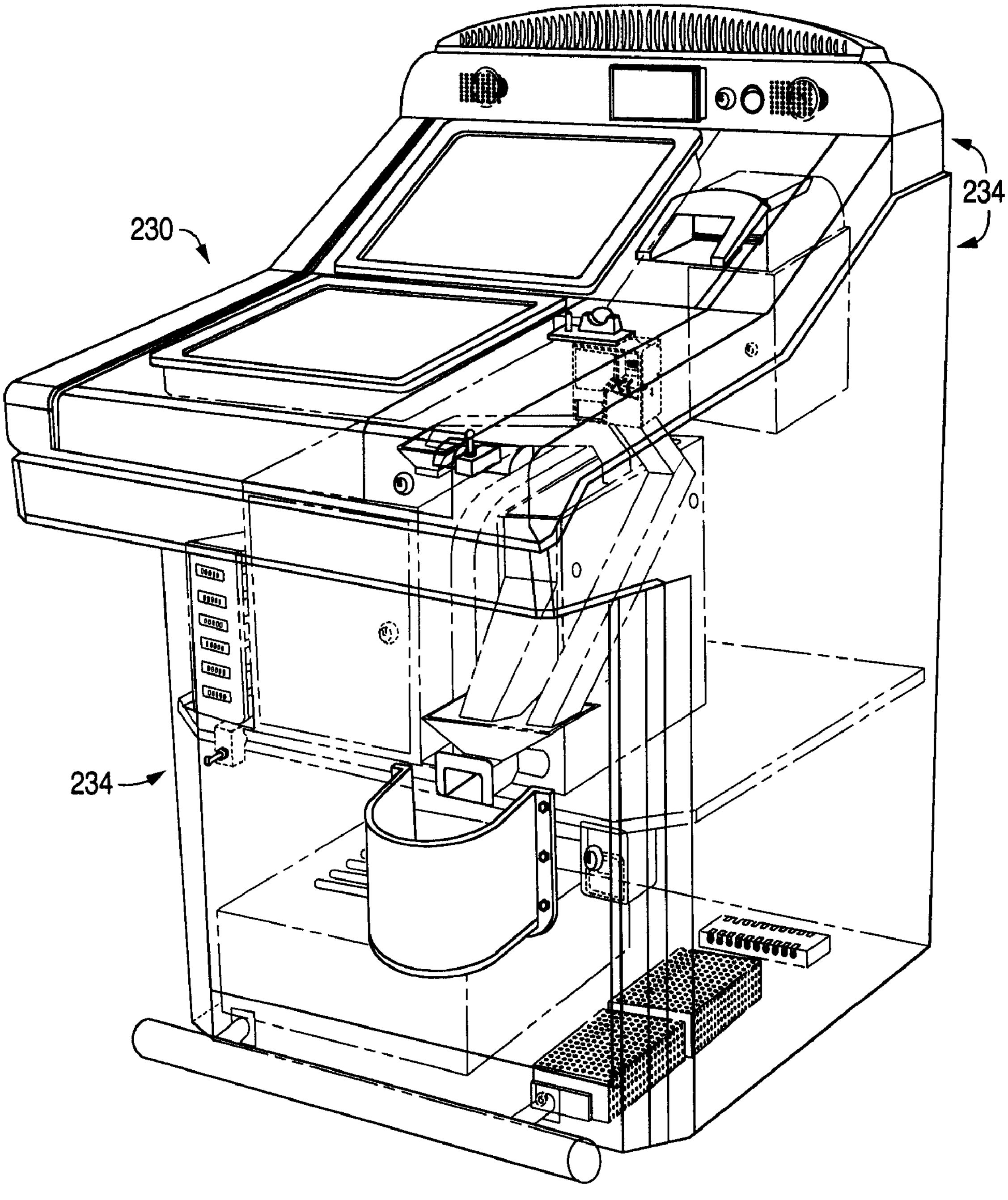
FIG. 6 shows another embodiment of the overall interior design of the betting terminal.

FIGS. 5 and 6 show two embodiments of the betting terminal (BT) 230. FIG. 5 shows an embodiment of BT 230 that has an opaque cover 232. FIG. 6 shows an embodiment of the interior design of BT 230.

Figure 7:
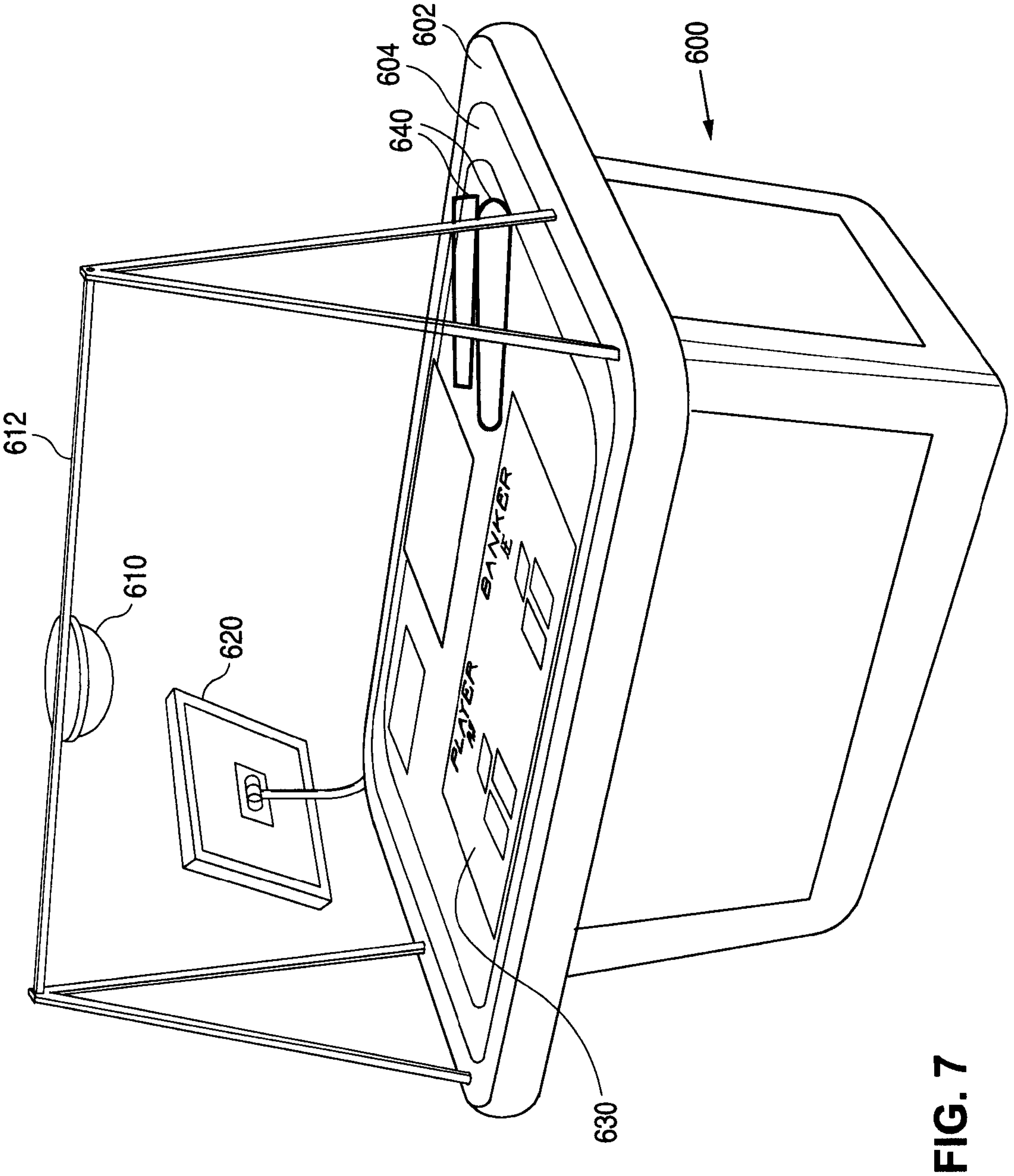
FIG. 7 shows an embodiment of the design of the dealing table.

In some embodiments, the gaming system includes a dealing table. An embodiment of the dealing table is shown in FIG. 7, which includes a main body 600, an overhead video camera 610 supported by a handle 612, a signaling mechanism (e.g., a touch screen) 620 for prompting the dealer of the dealing process, a lighting mechanism 630 for indication of the order the card dealing process, and rings 640 marking the space for placing the card shuffle master and box for disposal of played cards. The main body 600 has an outer rim 602 and inner rim 604.

Figure 8:
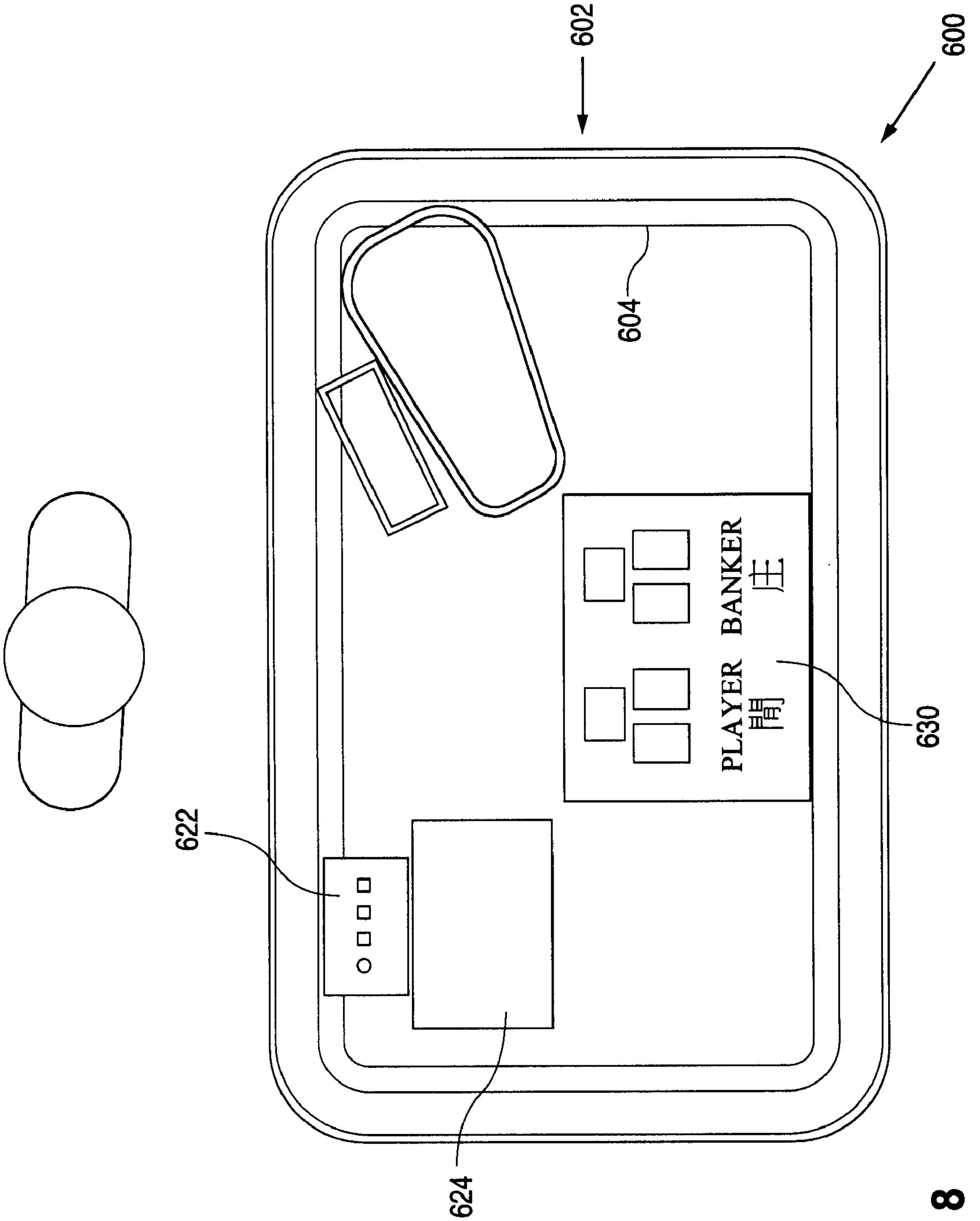
FIG. 8 shows an embodiment of the layout of the dealing table.

Another embodiment of the dealing table is shown in FIG. 8, which has a main body (DT 600), a touch screen 620 that includes a screen 622 and a pop up mechanism 624 for the touch screen, a lighting mechanism 630, and rings 640 marking the space for placing the card shuffle master and box for disposal of played cards. The main body 600 has an outer rim 602 and inner rim 604. In one embodiment, the main body 600 of the dealing table shown in FIG. 8 has an overall dimension of 1600 mm×1000 mm, the outer rim having an outer dimension of 1600 mm×1000 mm and an inner dimension of 1440 mm×840 mm, and the inner rim having an outer dimension of 1440 mm×840 mm and an inner dimension of 1350 mm×750 mm. The touch screen 620 includes a screen 622 having a dimension of 220 mm×130 mm and a pop up mechanism 624 having a dimension of 275 mm. The lighting mechanism has a dimension of 500 mm×400 mm.

Figure 9:
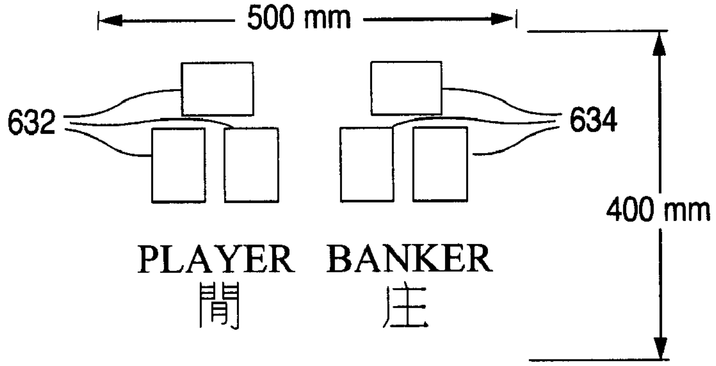
FIG. 9 shows an embodiment of the layout of the dealing table having lights indicating the order of the card dealing process.

FIG. 9 shows an embodiment of the lighting mechanism 630 of the dealing table as shown in FIG. 7 or 8. The lighting mechanism 630 includes lighting 632 indicating the next card shall be dealt to the Player and lighting 634 indicating the next card shall be dealt to the Banker. In one embodiment, the lighting mechanism can have a dimension of 500 mm×400 mm.

Figure 10:
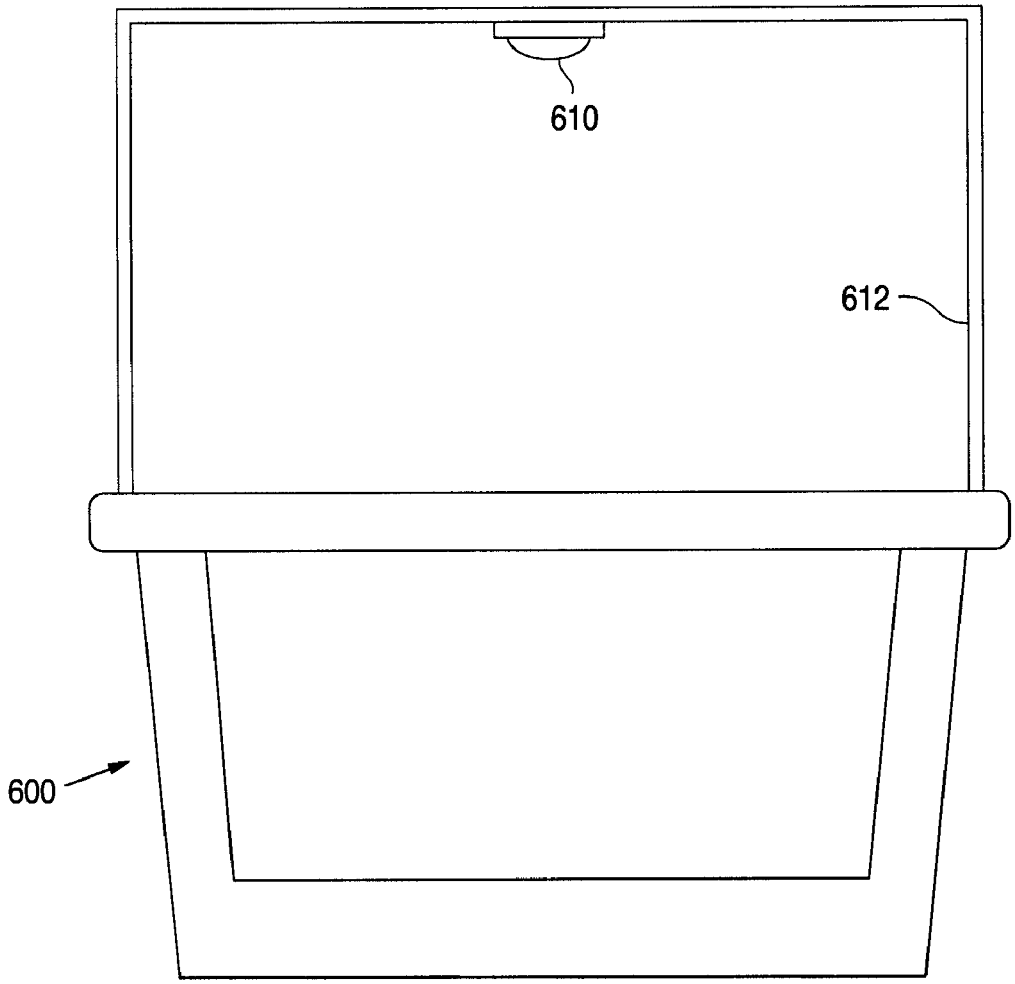
FIG. 10 shows the side view of a design of the dealing table.

FIG. 10 shows a side view of an embodiment of the dealing table of the present invention, which shows the main body 600 and the overhead video camera 610 supported by handle 612. In one embodiment, the main body 600 can have a length of 1600 mm and a height of 850 mm, and handle 612 can have a height of 850 mm.

Figure 11:
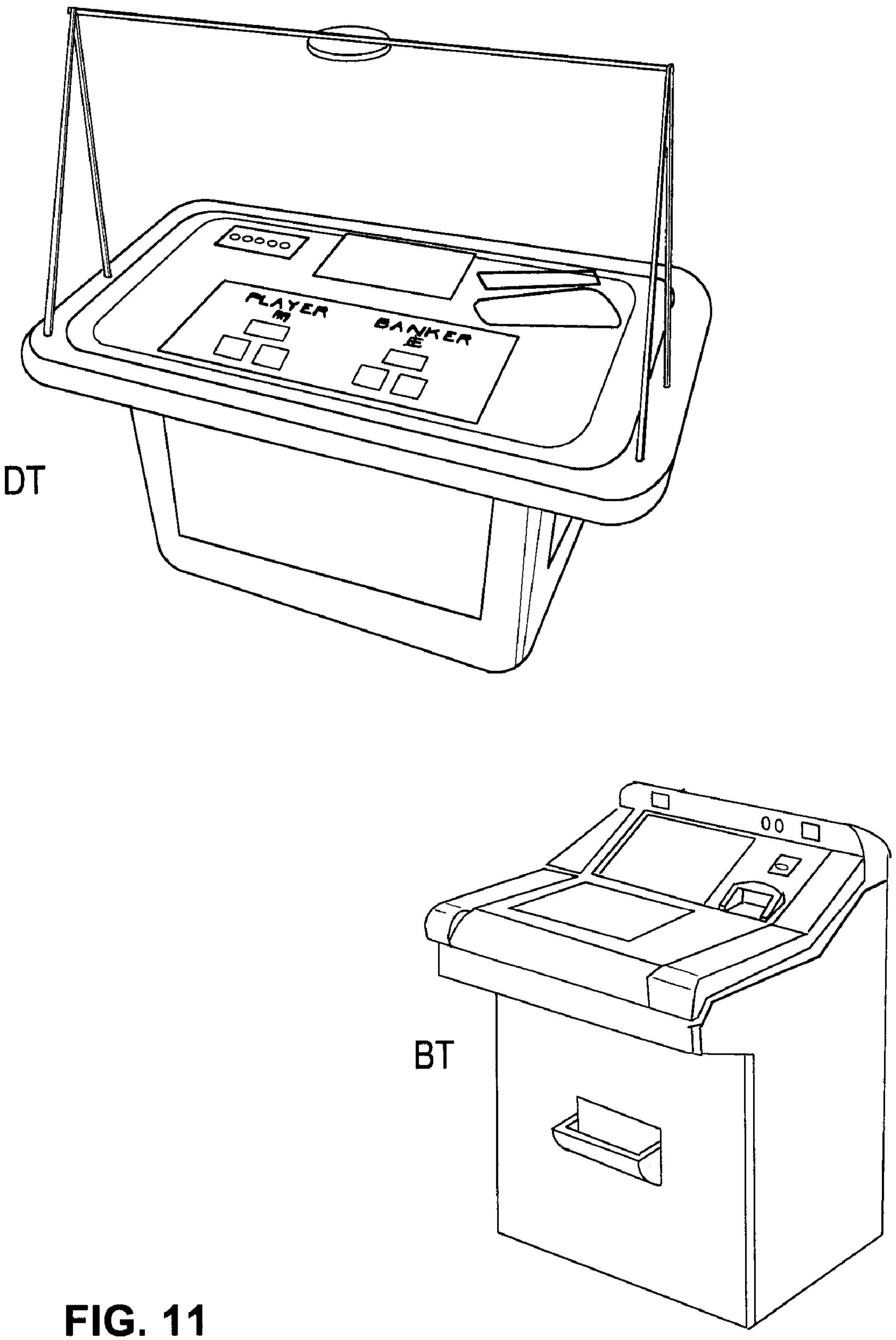
FIG. 11 shows an embodiment of the overall layout of betting terminals and the dealing table.
Figure 12:
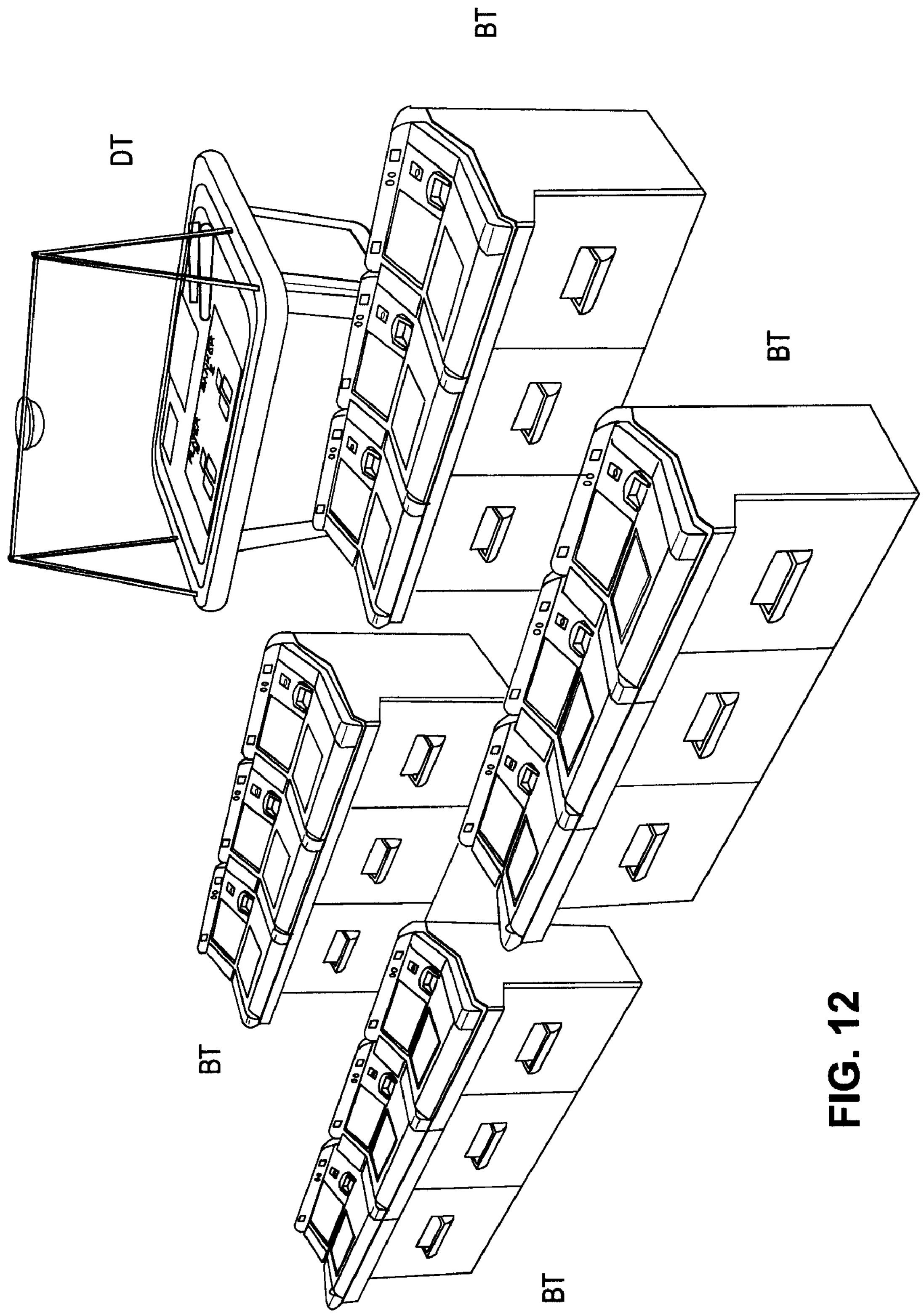
FIG. 12 shows an embodiment of one design of the Live Baccarat of present invention.
Figure 13:
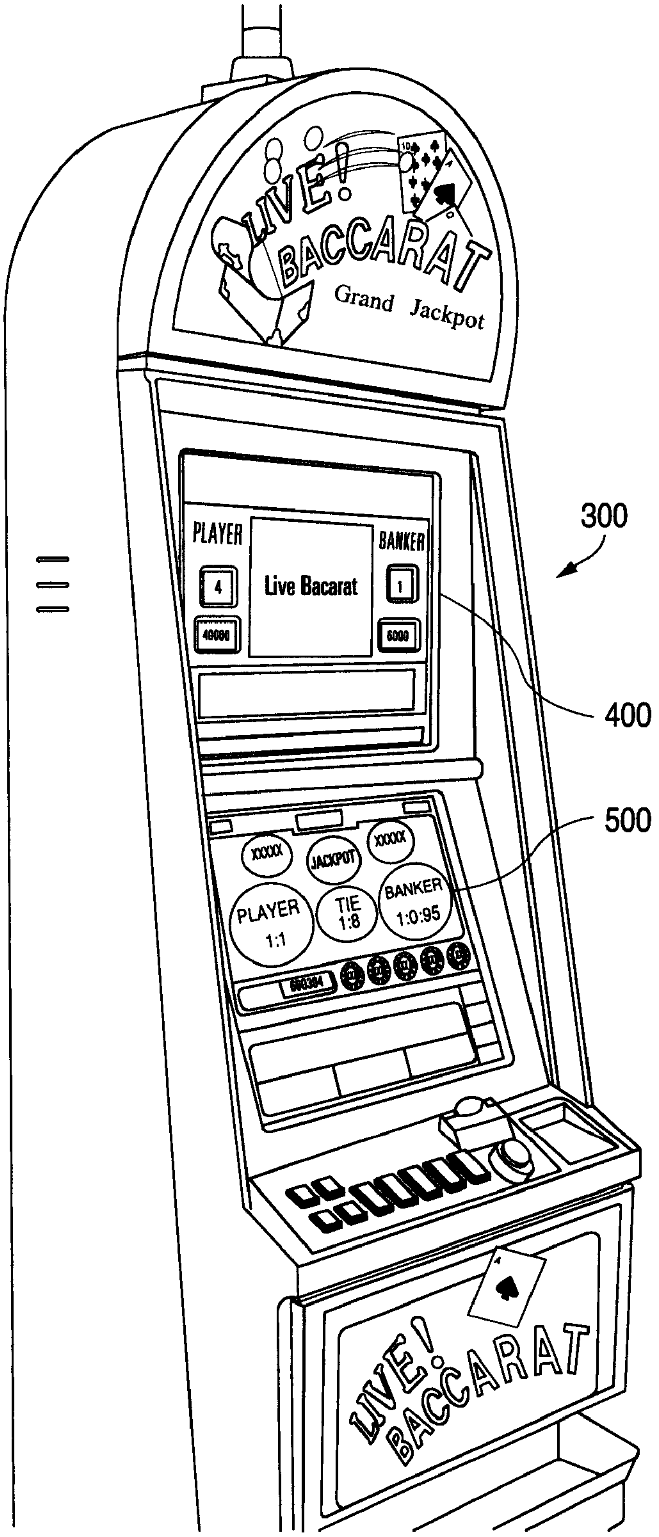
FIG. 13 shows an embodiment of another design of the Live Baccarat betting terminal of the present invention.

FIG. 11 shows an embodiment of the gaming system of the present invention that includes a dealing table and a betting terminal. FIG. 12 shows the overall layout of an embodiment of the gaming system of the present invention, which includes a dealing table and a plurality of betting terminals. FIG. 13 shows the overall layout of a further embodiment of the gaming system of the present invention.

In some other embodiments, the baccarat jackpot game can be played in an entertainment setting, e.g., in the form of game device such as laptop or desktop computers.

In a further embodiment, the baccarat jackpot game can be played in a non-baccarat game, e.g., blackjack, or showhand. The rules of these games other than baccarat games are known to one in the art.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A method of playing a live baccarat game which allows a player to bet a separate bet on a separate jackpot game, comprising:

dealing cards to a player hand and a bank hand according to a set of conventional baccarat rules;

allowing at least a first player to place a bet at a betting terminal on the live baccarat game, allowing at least a second player to place a bet at a betting terminal on a separate jackpot game to provide a jackpot bet, wherein the second player is the same as or different from the first player, determining a winning outcome of the live baccarat game according to the set of conventional baccarat rules, determining a winning outcome of the separate jackpot game by a control unit according to a combination of cards that comprises at least one zero-point cards, the at least one zero-point cards being drawn in the live baccarat game as at least one of 10, J, Q or K, and wherein the separate jackpot game has a jackpot pool with an initial contribution from a banker associated with the live baccarat game, a certain predetermined percentage of the jackpot bet is contributed to the jackpot pool, a certain predetermined percentage of the jackpot bet is collected by the banker and a certain predetermined percentage of the jackpot bet is accumulated as seed for a subsequent jackpot game.

2. The method of claim 1, wherein the banker who operates the live baccarat game makes an initial contribution to the jackpot pool.

3. The method of claim 1, wherein the set of conventional baccarat rules are Las Vegas baccarat rules or Macau baccarat rules.

4. The method of claim 3, wherein the bet on the live baccarat game is selected from the group consisting of a bet on player hand win, a bet on bank hand win, a tie bet, a bet on player pair, and a bet on bank pair, where the bet on player hand win or the bet on bank hand win can combine with any or all of the tie bet, the bet on player pair and the bet on bank pair.

5. The method of claim 4, wherein the jackpot pool is won by a combination of cards that comprises A, K, Q, J, 10 in spade, regardless of the sequence.

6. The method of claim 4, wherein the jackpot pool is won by a combination of cards that comprises K, Q, J, 10 in spade and A in either heart, club or diamond, regardless of the sequence.

7. The method of claim 4, wherein the jackpot pool is won by a combination of cards selected from:

Spade A plus K, Q, J, 10 in Heart, Club or Diamond;
Heart A plus K, Q, J, 10 in Spade, Club or Diamond;
Club A plus K, Q, J, 10 in Spade, Heart or Diamond; or
Diamond A plus K, Q, J, 10 in Spade, Heart, or Club.

8. The method of claim 1, wherein the jackpot pool is won by a combination of cards that comprises A, K, Q, J, and 10, regardless of the suit.

9. A non-transitory computer readable medium including a software program or a plurality of software programs that allows one to play a live baccarat game and allows a player to bet a separate bet on a separate jackpot game, according to the method:

dealing cards to a player hand and a bank hand according to a set of conventional baccarat rules;

allowing at least a first player to place a bet at a betting terminal on the live baccarat game, allowing at least a second player to place a bet at a betting terminal on the separate jackpot game to provide a jackpot bet, wherein the second player is the same as or different from the first player, determining a winning outcome of the live baccarat game according to the set of conventional baccarat rules, determining a winning outcome of the separate jackpot game by a control unit according to a combination of cards that comprises at least one zero-point cards, the at least one zero-point cards being drawn in the live baccarat game as at least one of 10, J, Q or K, and wherein the separate jackpot game has a jackpot pool with an initial contribution from a banker associated with the live baccarat game, a certain predetermined percentage of the jackpot bet is contributed to the jackpot pool, a certain predetermined percentage of the jackpot bet is collected by the banker and a certain predetermined percentage of the jackpot bet is accumulated as seed for a subsequent jackpot game.

10. A system for playing a live baccarat game which allows a player to place a bet on a separate jackpot game, comprising:

a control unit for dealing cards to a player hand and a bank hand according to a set of conventional baccarat rules;

a betting terminal which allows at least a first player to place a bet on the live baccarat game, a betting terminal which allows at least a second player to place a separate bet at a betting terminal on a separate jackpot game to provide a jackpot bet, wherein the second player is the same as or different from the first player, a betting computation and tract record central processing unit that determines a winning outcome of the live baccarat game according to the set of conventional baccarat rules, and determining a winning outcome of the separate jackpot game according to a combination of cards that comprises at least one zero-point cards, the at least one zero-point cards being drawn as at least one of 10, J, Q or K in the live baccarat game;

wherein the separate jackpot came has a jackpot pool with an initial contribution from a banker associated with the live baccarat game, a certain predetermined percentage of the jackpot bet is contributed to the jackpot pool, a certain predetermined percentage of the jackpot bet is collected by the banker and a certain predetermined percentage of the jackpot bet is accumulated as seed for a subsequent jackpot game.

11. An electronic device or entertainment gaming machine comprising:

a control unit for dealing cards to a player hand and a bank hand according to a set of conventional baccarat rules;

a betting terminal which allows at least a first player to place a bet on a live baccarat game, a betting terminal which allows at least a second player to place a separate bet at a betting terminal on a separate jackpot game to provide a jackpot bet where the second player is the same as or different from the first player, a betting computation and tract record central processing unit having a non-transitory computer readable medium including a software program or a plurality of software programs that determines a winning outcome of the live baccarat game according to the set of conventional baccarat rules, and determining a winning outcome of the separate jackpot game according to a combination of cards that comprises at least one zero-point cards, the at least one zero-point cards being drawn as at least one of 10, J, Q or K in the live baccarat game;

wherein the separate jackpot game has a jackpot pool with an initial contribution from a banker associated with the live baccarat game, a certain predetermined percentage of the jackpot bet is contributed to the jackpot pool, a certain predetermined percentage of the jackpot bet is collected by the banker and a certain predetermined percentage of the jackpot bet is accumulated as seed for a subsequent jackpot game.

12. The electronic device of claim 11, which is a laptop or desktop computer.

* * * * *